United States Patent
Bergström et al.

(10) Patent No.: US 10,939,368 B2
(45) Date of Patent: Mar. 2, 2021

(54) TERMINAL AND METHOD FOR INTER RAT ACCESS SELECTION IN A COMMUNICATIONS NETWORK

(71) Applicant: Telefonaktiebolaget L M Ericsson (publ), Stockholm (SE)

(72) Inventors: Mattias Tan Bergström, Stockholm (SE); Magnus Stattin, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 887 days.

(21) Appl. No.: 14/910,891

(22) PCT Filed: Aug. 5, 2014

(86) PCT No.: PCT/SE2014/050915
§ 371 (c)(1),
(2) Date: Feb. 8, 2016

(87) PCT Pub. No.: WO2015/020596
PCT Pub. Date: Feb. 12, 2015

(65) Prior Publication Data
US 2016/0192286 A1    Jun. 30, 2016

Related U.S. Application Data

(60) Provisional application No. 61/863,915, filed on Aug. 9, 2013.

(51) Int. Cl.
*H04W 48/18* (2009.01)
*H04W 4/06* (2009.01)
*H04W 88/06* (2009.01)

(52) U.S. Cl.
CPC ........... *H04W 48/18* (2013.01); *H04W 4/06* (2013.01); *H04W 88/06* (2013.01)

(58) Field of Classification Search
CPC ........ H04W 4/06; H04W 48/18; H04W 88/06
See application file for complete search history.

(56) References Cited

U.S. PATENT DOCUMENTS

| | | | |
|---|---|---|---|
| 2006/0221901 A1 | 10/2006 | Yaqub et al. | |
| 2010/0099450 A1* | 4/2010 | Lu | H04W 72/0406 455/501 |

(Continued)

FOREIGN PATENT DOCUMENTS

| | | |
|---|---|---|
| CN | 101005692 A | 7/2007 |
| CN | 101836483 A | 9/2010 |
| CN | 103731895 A | 4/2014 |

OTHER PUBLICATIONS

Ericsson, "WLAN/3GPP Radio Interworking—More on Idle and Connected mode", 3GPP TSG-RAN WG2 #82 Tdoc R2-131886, Fukuoka, Japan, May 20-24, 2013, 1-10.

(Continued)

*Primary Examiner* — Asad M Nawaz
*Assistant Examiner* — Kai Chang
(74) *Attorney, Agent, or Firm* — Murphy, Bilak & Homiller, PLLC

(57) ABSTRACT

A method in a terminal for inter RAT access selection is provided. The terminal is capable to operate in one or more RATs. The terminal receives (201) (202), from a network node, one or more dedicated parameters relating to inter RAT access selection, and one or more broadcasted parameters relating to inter RAT access selection. The one or more broadcasted parameters correspond to the respective one or more dedicated parameters. The one or more broadcasted parameters relates to inter RAT access selection. The terminal then acts (203) for inter RAT access selection according to any one out of: —one or more updated dedicated parameters, updated based on changes to corresponding one or more broadcast parameters, and—any one out of the one or (Continued)

more received dedicated parameters, updated dedicated parameters, or corresponding broadcasted parameters, based on whether one or more conditions are fulfilled or not.

10 Claims, 8 Drawing Sheets

(56) References Cited

U.S. PATENT DOCUMENTS

| | | | |
|---|---|---|---|
| 2010/0255836 A1 | 10/2010 | Chen | |
| 2011/0044253 A1 | 2/2011 | Zisimopoulos et al. | |
| 2012/0122458 A1* | 5/2012 | Jokinen | H04W 36/0061 455/437 |
| 2012/0214501 A1 | 8/2012 | Johansson et al. | |
| 2012/0282925 A1* | 11/2012 | Wehmeier | H04W 36/0083 455/434 |
| 2012/0294184 A1* | 11/2012 | Jung | H04W 36/0058 370/252 |
| 2013/0114515 A1* | 5/2013 | Koo | H04J 11/0023 370/329 |
| 2013/0143502 A1* | 6/2013 | Kazmi | H04W 88/06 455/62 |
| 2013/0188499 A1* | 7/2013 | Mach | H04W 48/20 370/252 |
| 2014/0106751 A1* | 4/2014 | Chen | H04W 36/0066 455/436 |
| 2014/0162632 A1* | 6/2014 | Gajula | H04W 24/02 455/426.1 |
| 2014/0213277 A1* | 7/2014 | Jang | H04W 28/08 455/453 |
| 2014/0315555 A1* | 10/2014 | Zhang | H04W 36/0094 455/437 |
| 2015/0119060 A1* | 4/2015 | Aoyagi | H04W 48/02 455/452.1 |
| 2016/0316408 A1* | 10/2016 | Nagasaka | H04W 48/18 |

OTHER PUBLICATIONS

ETSI, "LTE; Evolved Universal Terrestrial Radio Access (E-UTRA)", ETSI TS 136 304 V11.4.0, Jul. 2013, 1-36.

* cited by examiner

TERMINAL AND METHOD FOR INTER RAT ACCESS SELECTION IN A COMMUNICATIONS NETWORK

Embodiments herein relate to a terminal and a method therein. In particular, it relates to maintenance of parameters such as thresholds for inter Radio Access Technologies (RAT) access selection.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

A wireless Local Area Network (WLAN) technology known as "Wi-Fi" has been standardized by IEEE in the 802.11 series of specifications, i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications"). As currently specified, Wi-Fi systems are primarily operated in the 2.4 GHz or 5 GHz bands.

The IEEE 802.11 specifications regulate the functions and operations of the Wi-access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardized by the 3GPP, including the radio-access technologies known as LTE, Universal Mobile Telecommunications System/Wideband Code-Division Multiple Access, and Global System for Mobile Communications (GSM), see Wi-Fi as a wireless technology that may provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network and provide the same or overlapping services. Currently, several standardization organizations are intensely active in the area of operator-controlled Wi-Fi. In 3GPP, for example, activities to connect Wi-Fi access points to the 3GPP-specified core network are being pursued. In the Wi-Fi Alliance (WFA), activities related to certification of Wi-Fi products are undertaken, which to some extent is also driven from the need to make Wi-Fi a viable wireless technology for cellular operators to support high bandwidth offerings in their networks. In these standardization efforts, the term "Wi-Fi offload" is commonly used and indicates that cellular network operators seek means to offload traffic from their cellular networks to e.g., during peak-traffic-hours and in situations when the cellular network needs to be off-loaded for one reason or another, e.g., to provide a requested quality-of-service, to maximize bandwidth, or simply for improved coverage.

Using WiFi/WLAN, the two terms are used interchangeably throughout this document, to offload traffic from the mobile networks is becoming more and more interesting from both the operator's and end user's points of view. Some of the reasons for this tendency are:

Additional frequency: by using WiFi, operators may access an additional 85 MHz of radio bandwidth in the 2.4 GHz band and another (close to) 500 MHz in the 5 GHz band.

Cost: From the operator's point of view, Wi-Fi uses unlicensed frequency that is free of charge. On top of that, the cost of Wi-Fi Access Points (APs), both from Capital Expense (CAPEX) and Operational Expenses (OPEX) aspects, is considerably lower than that of a 3GPP base station such as BS/eNB. Operators may also take advantage of already deployed APs that are already deployed in hotspots such as train stations, airports, stadiums, shopping malls, etc. Most end users are also currently used to having Wi-Fi for free at home, as home broadband subscriptions are usually flat rate, and public places.

Terminal support: Many UEs, including virtually all smartphones, and other portable devices currently available in the market, support Wi-Fi. In the WiFi world, the term Station (STA) is used instead of UE, and as such the terms UE, STA and terminal are used interchangeably in this document.

High data rate: Under low interference conditions and assuming the user is close to the Wi-Fi AP, Wi-Fi may provide peak data rates that outshine that of current mobile networks, for example, theoretically up to 600 Mbps for IEEE 802.11n deployments with Multiple Input Multiple Output (MIMO).

For a wireless operator, offering a mix of two technologies that have been standardized in isolation from each other raises the challenge of providing intelligent mechanisms for co-existence. One area that needs these intelligent mechanisms is connection management.

Many of today's portable terminals support Wi-Fi in addition to one or several 3GPP cellular technologies. In many cases, however, these terminals essentially behave as two separate devices, from a radio access perspective. The 3GPP radio access network and the UE-based modems and protocols that are operating pursuant to the 3GPP specifications are generally unaware of the wireless access W-Fi protocols and modems that may be simultaneously operating pursuant to the 802.11 specifications. Techniques for coordinated control of these multiple radio-access technologies are needed.

Terminal Modes in LTE

In LTE two terminal Radio Resource Control (RRC) protocol modes have been specified; RRC Idle mode and RRC Connected mode.

Connected mode enabled unicast data communication. When a terminal is in connected mode the terminal will have an RRC connection established which allows dedicated signalling from the network to the terminal.

To reduce power consumption, when data transfer is not on going, the terminal may be sent to idle mode in LTE. In idle mode unicast data transfer is not possible. A terminal in idle mode is selecting, according to some rules specified in 3GPP TS 36.304 v11.4.0, a cell on which it is camping. Camping is defined in 3GPP TS 36.304 v11.4.0. The terminal will read the broadcasted information on the cell which it is camping on which controls the terminal behaviour.

In LTE the network controls the transition from connected to idle mode.

WLAN/3GPP Radio Interworking

Work has started in 3GPP to enable interworking between 3GPP and WLAN. The focus of this work is on how steering of a terminal's traffic should be performed between 3GPP and WLAN.

In some proposed solutions the terminal will, according to some rules steer traffic from 3GPP to WLAN and from WLAN to 3GPP, or send a measurement report regarding WLAN to the 3GPP network. In the measurement reporting alternative the RAN may, based on the WLAN measurement report and other information known to the network, send a traffic steering command to the terminal indicating that the terminal should steer traffic from/to the WLAN.

These rules comprise thresholds for parameters. If the parameters exceeds/falls below the associated thresholds the terminal should take an action. One action may be that the UE should perform traffic steering from/to WLAN, another action could be that the UE should send a measurement report containing WLAN measurements to the 3GPP network which may then be used by the 3GPP network to decide whether to send a traffic steering command to the terminal telling the terminal to steer traffic from/to WLAN.

One example rule may be that if the parameter LTE Reference Signal Received Power (RSRP) falls below the threshold value −100 dBm and the parameter WLAN Received Signal Strength Indication (RSSI) exceeds the threshold value −90 dBm, the terminal should steer traffic from 3GPP to WLAN.

It has been discussed that the thresholds should be sent to the terminal by broadcasting and/or by dedicated signalling. A terminal which is in idle mode should read and apply the broadcasted thresholds. However, a terminal in connected mode may receive dedicated thresholds to allow per terminal control by the network. A terminal which has received dedicated thresholds will apply these instead of the broadcasted thresholds.

If, when a terminal has steered the traffic from 3GPP to WLAN, the terminal has no more traffic in the 3GPP network the network may indicate to the terminal that it should enter idle mode. Upon entering idle mode should read and apply the broadcasted thresholds.

SUMMARY

It is therefore an object of embodiments herein to provide an improved way of inter RAT access selection.

According to a first aspect of embodiments herein, the object is achieved by a method in a terminal for inter RAT access selection. The terminal is capable to operate in one or more Radio Access Technologies, RATs. The terminal receives from a network node, one or more dedicated parameters relating to inter RAT access selection. The terminal further receives from the network node, one or more broadcasted parameters relating to inter RAT access selection. The one or more broadcasted parameters correspond or at least partly correspond to the respective one or more dedicated parameters. The one or more broadcasted parameters relate to inter RAT access selection. The terminal then acts for inter RAT access selection according to any one out of:

one or more updated dedicated parameters, updated based on changes to corresponding one or more broadcast parameters, and any one out of the one or more received dedicated parameters, updated dedicated parameters, or corresponding broadcasted parameters, based on whether one or more conditions are fulfilled or not.

According to a second aspect of embodiments herein, the object is achieved by a terminal for inter RAT access selection, the terminal being capable to operate in one or more Radio Access Technologies, RATs. The terminal is configured to:

receive from a network node, one or more dedicated parameters relating to inter RAT access selection, receive from the network node, one or more broadcasted parameters relating to inter RAT access selection, which one or more broadcasted parameters at least partly correspond to the respective one or more dedicated parameters, and which one or more broadcasted parameters relates to inter RAT access selection, and act for inter RAT access selection according to any one out of:
- one or more updated dedicated parameters, updated based on changes to corresponding one or more broadcast parameters, and
- any one out of the one or more received dedicated parameters, updated dedicated parameters, or corresponding broadcasted parameters, based on whether one or more conditions are fulfilled or not.

An advantage is that embodiments of methods herein are provided for how a terminal handles a dedicated signaled parameter such that frequent updating of the parameter is avoided and hence highly loaded control channels are avoided.

BRIEF DESCRIPTION OF THE DRAWINGS

Examples of embodiments herein are described in more detail with reference to attached drawings in which.

DETAILED DESCRIPTION

Figure 1:
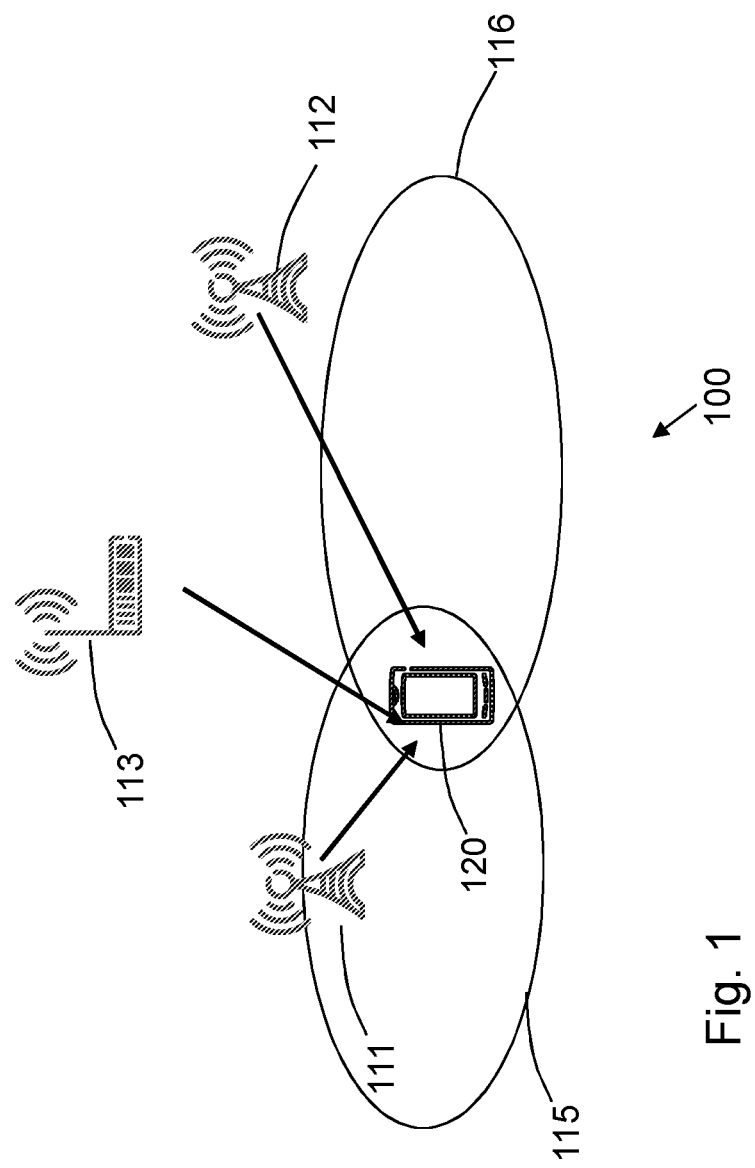
FIG. 1 is a schematic block diagram illustrating embodiments in a communications network.

As part of developing embodiments herein, a problem will first be identified and discussed.

According to the procedure discussed in 3GPP so far regarding how thresholds should be handled it will not be possible to achieve per terminal thresholds in idle mode as the terminal will apply the broadcasted thresholds when entering idle mode. Hence, a terminal which has its traffic steered to WLAN and therefore entered idle mode will apply the broadcasted thresholds and per terminal thresholds for traffic steering back from WLAN to 3GPP is not possible.

Furthermore, if based on the broadcasted thresholds, conditions for steering traffic to WLAN are not met, the terminal will steer its traffic back to the 3GPP network and return to connected mode where it may again be provided with terminal specific thresholds, by dedicated signalling, triggering steering of traffic to WLAN and entering idle mode w r t 3GPP network. I.e., an undesirable ping-pong condition may arise where traffic is continuously moved back and forth between WLAN and 3GPP network. Ping-pong conditions reduce performance.

With current solutions for WLAN/3GPP Radio interworking solutions it is not possible to achieve per terminal thresholds for controlling the access selection and/or traffic steering between 3GPP and WLAN for a terminal in idle mode, which limits flexibility and creates ping-ponging problems.

Methods are provided herein for how a terminal handles a dedicated signaled threshold such that frequent updating of the threshold may be avoided and hence highly loaded control channels are avoided.

Terminologies

The following commonly terminologies are used in the embodiments and are elaborated below:

Network node: In some embodiments the non-limiting radio network node is more commonly used and it refers to any type of radio network node serving a terminal or UE and/or connected to other network node or network element or any radio node from where terminal receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments the general term "network node" is used as corresponding to any type of radio network node or any network node, which communicates with at least a radio network node. Examples of network node are any radio network node stated above, core network node (e.g. MSC, MME etc.), O&M, OSS, SON, positioning node (e.g. E-SMLC), MDT etc.

Network: The term network may be used herein and it may refer to any network node e.g. as described above and herein.

Terminal: In some embodiments the non-limiting term terminal is used and may refer to any type of wireless device communicating with a radio network node in a cellular or mobile communication system. Examples of a terminal are User Equipment (UE), UE capable of machine to machine communication, PDA, iPad, Tablet, mobile terminals, smart phone, laptop embedded equipped (LEE), laptop mounted equipment (LME), USB dongles etc.

FIG. 1 depicts an example of a wireless communications network 100 in which embodiments herein may be implemented. The wireless communications network 100 comprises multiple wireless communication networks using different RATs such as LTE, WCDMA, GSM network, any 3GPP cellular network, WLAN also referred to as WiFi, Wimax, or any RAT.

Figure 5:
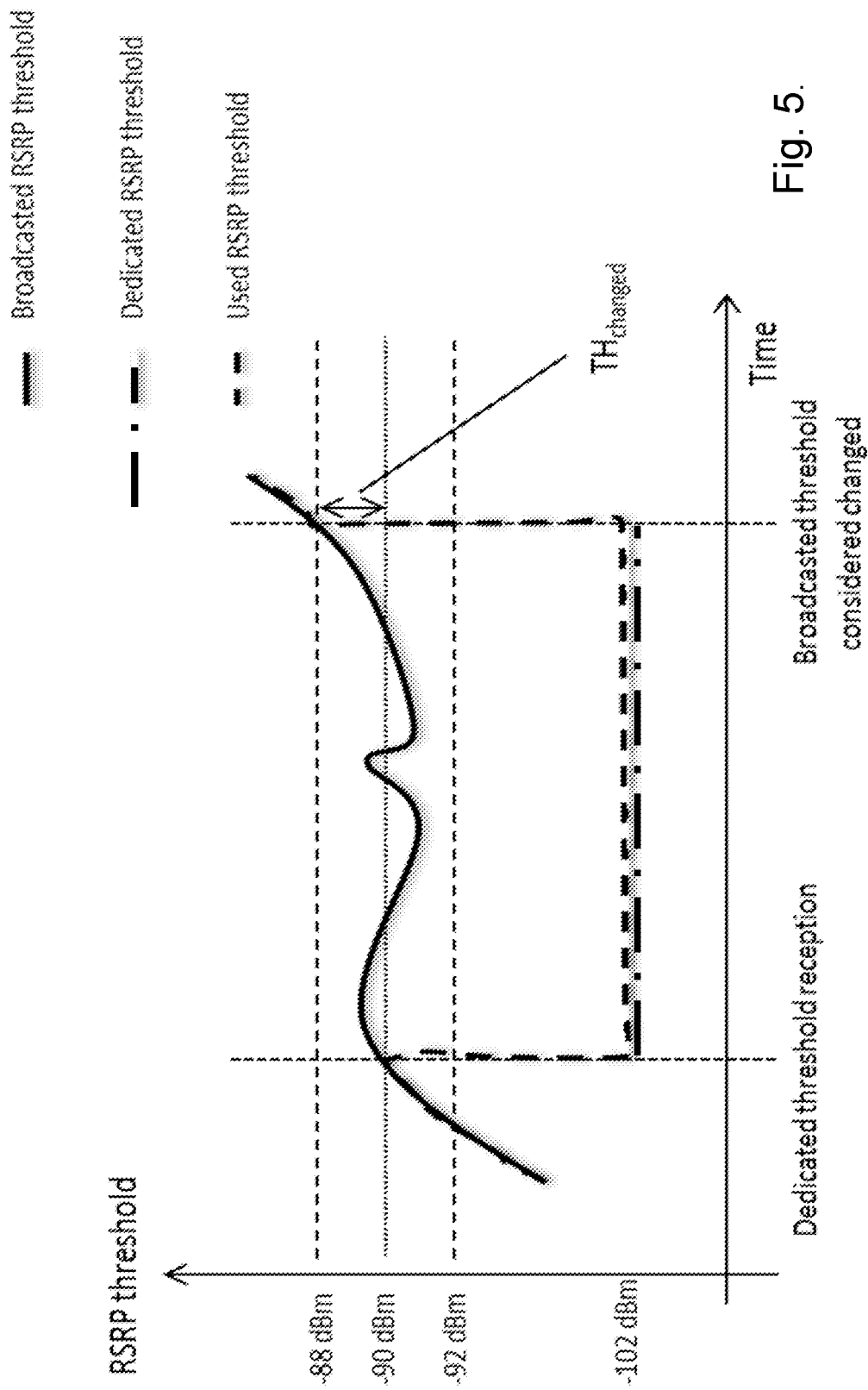
FIG. 5 is a schematic block diagram illustrating embodiments herein.

The wireless communications network 100 comprises a plurality of network nodes whereof two, a network node 111 and a second network node 112 are depicted in FIG. 5. The network node 111 and the second network node 112 may each be a transmission point such as a radio base station, for example an eNB, an eNodeB, or an Home Node B, an Home eNode B or any other network node capable to serve a user equipment or a machine type communication device in a wireless communications network. The wireless communications network 100 may further comprise an access point 113 such as e.g. an access point for a WLAN.

The network node 111 may serve a first cell 115, and the second network node 112 may serve a second cell 116.

A terminal 120 also referred to as a user equipment or UE is operating in the wireless communication network 100. The terminal 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term terminal used in this document also covers other wireless devices such as Machine to machine (M2M) devices.

The terminal 120 is capable to operate in one or more RATs, such as e.g. LTE, WCDMA, GSM network, any 3GPP cellular network, WLAN also referred to as WiFi, Wimax, or any RAT. This means that the terminal 120 may support Wi-Fi in addition to one or several 3GPP cellular technologies.

Embodiments herein describe how a terminal also referred to as a UE, such as the terminal 120 may maintain parameters such as thresholds used for WLAN/3GPP interworking, however the methods described herein may also be applied to other parameters, such as non-thresholds, which may be both broadcasted and unicasted.

Embodiments herein e.g. enable terminal specific parameters such as thresholds for WLAN and 3GPP interworking in idle mode. Methods are also described to avoid the usage of outdated parameters such as thresholds for terminals, such as the terminal 120, in IDLE mode which may possibly result in that the terminal would use unsuitable parameters such as thresholds.

Figure 2:
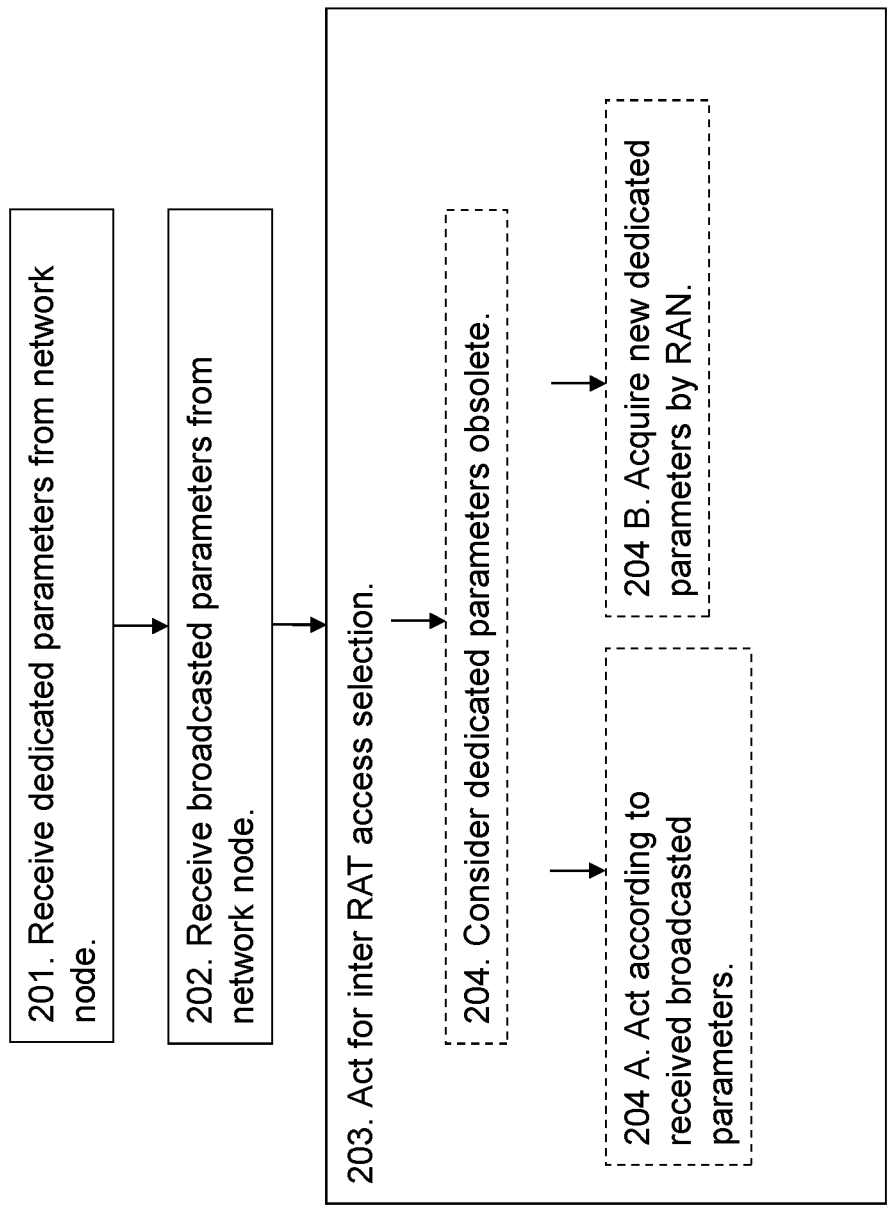
FIG. 2 is a flowchart depicting embodiments of a method.

Example embodiments of a method in a terminal 120 for inter RAT access selection will now be described with reference to a flowchart depicted in FIG. 2. The term inter RAT access selection may comprise "access selection" and/or "traffic steering" and/or "traffic routing.

As mentioned above, the terminal 120 is capable to operate in one or more RATs, such as WLAN RAT e.g. WiFi RAT, in addition to one or several 3GPP RATs.

The method comprises the following actions, which actions may be taken in any suitable order.

Action 201

The terminal 120 receives from the network node 111, one or more dedicated parameters relating to inter RAT access selection. The parameters may comprise thresholds, identifiers for networks and/or network nodes such as WLAN network identifiers and/or WLAN network node identifiers, pointers to certain policies and/or rules, indicators of load and/or utilization of a network and/or network node(s), one or more offloading preference indicator, operator policy indicators, timer values, random numbers, user group indicators, etc. The parameters may e.g. be referred to RAN assistance parameters and/or RAN assistance information.

Action 202

The terminal 120 further receives, from the network node 111, one or more broadcasted parameters relating to inter RAT access selection. The one or more broadcasted parameters at least partly correspond to the respective one or more dedicated parameters. The one or more broadcasted parameters relate to inter RAT access selection.

Action 203

The terminal 120 then acts for inter RAT access selection according to any one out of:

first alternative, one or more updated dedicated parameters, updated based on changes to the corresponding one or more broadcast parameters, and second alternative, any one out of: the one or more received dedicated parameters, updated dedicated parameters, or corresponding broadcasted parameters, based on whether one or more conditions are fulfilled or not. This will be further explained below.

In some embodiments, the acting for inter RAT access selection according to the, one or more received dedicated parameters, updated dedicated parameters, or corresponding broadcasted parameters, based on whether one or more conditions are fulfilled or not according to second alternative, comprises one or more out of:

when one or more conditions are fulfilled, keep acting according to the one or more received dedicated parameters, when the one or more conditions are fulfilled, acting according to one or more updated dedicated parameters, updated based on changes to corresponding one or more broadcast parameters, when the one or more conditions are not fulfilled or are no longer fulfilled, acting according to one or more updated dedicated parameters, updated based on changes to corresponding one or more broadcast parameters, and when the one or more conditions are not fulfilled or are no longer fulfilled, acting according to the corresponding broadcasted parameters.

In some embodiments the terminal 120 has changed cell from the first cell 115 to the second cell 116. In these embodiments, the terminal 120 has received an indication from a network node, which indication relates to a set of cells. In these embodiments the one or more conditions for acting for inter RAT access selection may comprise whether or not the second cell 116 is one of the cells in the set of cells.

The indication may e.g. be a bit flag indicating that the terminal 120 shall keep dedicated parameters at cell reselection. In this case if the bit flag is not provided to the terminal 120, the terminal 120 may be configured to discard dedicated parameters at cell reselection: Another possibility is that if the bit flag is not provided to the terminal 120, the terminal 120 may autonomously select whether to keep or discard the dedicated parameters. The opposite would also be possible, i.e. that a bit flag is indicating that the terminal 120 shall discard dedicated parameters at cell reselection. In this case if the bit flag is not provided to the terminal 120, the terminal 120 may be configured to keep dedicated parameters at cell reselection, another possibility is that if the bit flag is not provided to the terminal 120, the terminal 120 may autonomously select whether to discard or keep the dedicated parameters. The flag then relates to the set of cells.

In some embodiments, the terminal 120 shall always keep parameters such as the thresholds upon cell reselection, i.e. that there is no explicit indication that threshold retention should be done.

Conditions:

The conditions may e.g. be any one or more out of:

conditions relating to parameters of a second cell 116, after the terminal 120 has changed cell from a first cell 115 to the second cell 116, and conditions relating to the broadcast parameters being changed, conditions relating to the terminal 120 having performed less than a number of cell changes since the dedicated threshold was received. The terminal 120 may then then count the number of cell changes, from that it has received the dedicated parameters such as thresholds, and when it has reached N cell changes it will no longer act according to the dedicated threshold. In one alternative of this condition, if the terminal 120 re-enters the cell in which it received the dedicated parameters such as thresholds, it will restart the counting from zero.

In some embodiments, the acting for inter RAT access selection is performed when the terminal 120 is not able to receive or is configured not to receive dedicated parameters any more.

In some embodiments, the one or more broadcasted parameters is represented by one or more broadcasted thresholds, and the one or more dedicated parameters is represented by one or more dedicated thresholds. In some embodiments, the one or more conditions may comprise that the one or more broadcasted parameters such as the one or more broadcasted thresholds in the second cell 116 corresponding to the one or more dedicated parameters such as the one or more dedicated thresholds is equal to, or is close by a threshold, such as e.g. a threshold $TH_{close}$, to the one or more broadcasted parameters such as the one or more broadcasted thresholds of the first cell (115) in which the one or more dedicated parameters such as the one or more dedicated thresholds were received. E.g. if the parameters comprises two values then there may be one threshold $TH_{close}$ per value.

E.g., consider that the terminal 120 receives one or more dedicated parameters such as the one or more thresholds from a cell A, then retains these parameters upon reselection to a cell B, then later the terminal 120 reselects to a cell C. In this case the terminal 120 may not have received the one or more dedicated parameters such as the one or more dedicated thresholds from the "first cell" when doing the second reselection since in that case cell B is the "first cell". However embodiments herein may be applied for parameter handling when the terminal 120 is changing from cell B to cell C.

In some embodiments the acting for inter RAT access selection is performed by updating the one or more dedicated thresholds by considering a change of the corresponding one or more broadcasted thresholds.

The one or more dedicated thresholds may be updated by multiplying a change of the broadcasted threshold with a scaling factor.

Action 204

In some embodiments, the acting for inter RAT access selection according to the, one or more received dedicated parameters, updated dedicated parameters, or corresponding broadcasted parameters, based on whether one or more conditions are fulfilled or not according to second alternative, comprises that when the one or more conditions are not fulfilled or are no longer fulfilled, the terminal 120 considers the one or more dedicated parameters obsolete. It may be so that the terminal 120 will discard dedicated parameters which are considered obsolete.

Action 204 A.

In a first embodiment, wherein the one or more dedicated parameters are considered obsolete, the method further comprises that the terminal 120 acts according to the received broadcasted parameters.

Action 204 B.

In a second embodiment, wherein the one or more dedicated parameters are considered obsolete, the method further comprises that the terminal 120 acquires one or more new dedicated parameters by the Radio Access network, RAN.

In the following section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments. Please note that the terms threshold and parameter are used interchangeable. This means that when the term threshold is used it also mean to cover the term parameter.

As mentioned above it may be possible to apply the procedure to non-thresholds also, the term parameters refer to thresholds and non-thresholds. One non-threshold parameter that embodiments herein may be applied to is 3GPP load indication. Assume that the 3GPP RAN broadcasts its load in percent. The RAN may send the load with dedicated signal AND broadcast signaling, and a UE such as the terminal 120, may have got a dedicated load figure of 70% while load of 40% is broadcasted. The UE such as the terminal 120 may then apply the "threshold tracking" behavior and RAT access selection according to this load.

Figure 3:
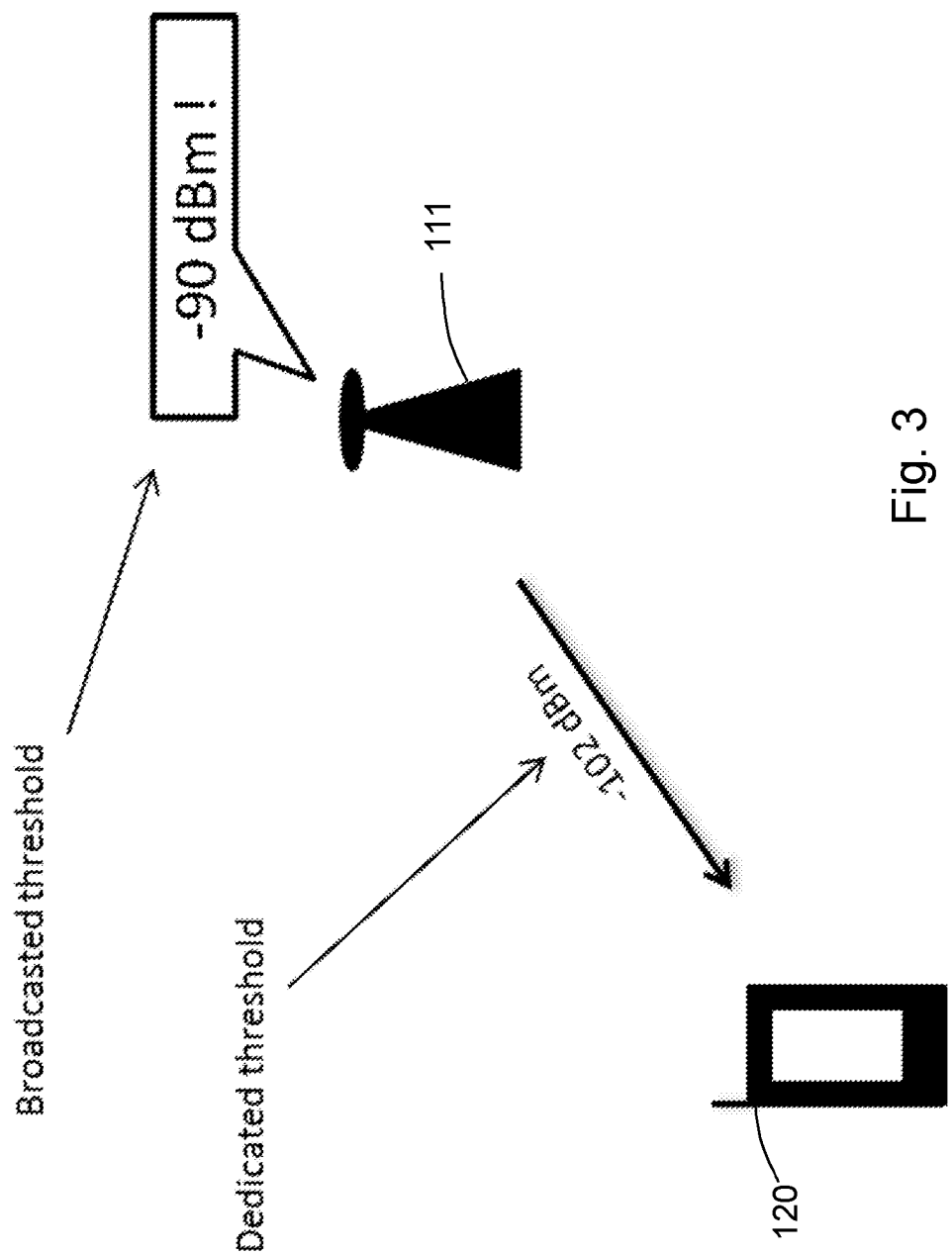
FIG. 3 is a flowchart depicting embodiments of a method in a first network node.

The network such as the network node 111 may send these parameters such as thresholds to the terminal 120 by dedicated signaling, e.g. referred herein as dedicated threshold, or by broadcast signaling, e.g. referred herein as broadcasted threshold. One example of a threshold is RSRP threshold which tells the terminal 120 which should be the measured RSRP in LTE for the terminal 120 to connect to WLAN. E.g. if the RSRP threshold is −100 dBm the terminal 120 should connect to WLAN if the terminal's 120 measured RSRP is below −100 dBm. The terminal 120 may receive parameters such as thresholds for multiple parameters, e.g. one threshold for RSRP and one for WLAN load. It may be so that different behaviors are applied for different threshold values, e.g. the terminal 120 may apply the behavior of one embodiment the RSRP threshold while applying another behavior for the WLAN load threshold. See an example in FIG. 3 where the threshold value −90 dBm is broadcasted and the network such as the network node 111 has signaled to the terminal 120 a dedicated threshold value −102 dBm. FIG. 3 depicts examples of Broadcasted and dedicated parameters such as e.g. thresholds.

As described above; the terminal 120 may receive a threshold with dedicated signaling or by broadcast signaling. When it herein is said "corresponding threshold" it is referred to that e.g. the broadcasted RSRP threshold corresponds to the dedicated RSRP threshold and the dedicated WLAN load threshold corresponds to the broadcasted WLAN load threshold, etc.

It is herein sometimes referred to that terminal 120 upon entering idle state, however it should be appreciated that this is just an example and the described embodiments may applied to other states. For example, in Universal Mobile Terrestrial System (UMTS) more states are defined in which the embodiments may be applied, e.g. CELL_FACH, CELL_PCH and URA_PCH. The RRC idle mode, which means no connection, has the lowest energy consumption. The states in the RRC connected mode are CELL_DCH (Dedicated Channel), CELL_FACH (Forward access channel), CELL_PCH (Cell Paging channel) and URA_PCH (URA Paging channel). The methods described herein may even be applied when a UE such as the terminal 120 is in connected state, or equivalent mode in other RAT's. The benefit of applying these methods for connected mode is, for example, that the amount of signaling due to threshold or parameter updating is reduced.

Conditional Threshold Retention Upon Cell Change

Figure 4:
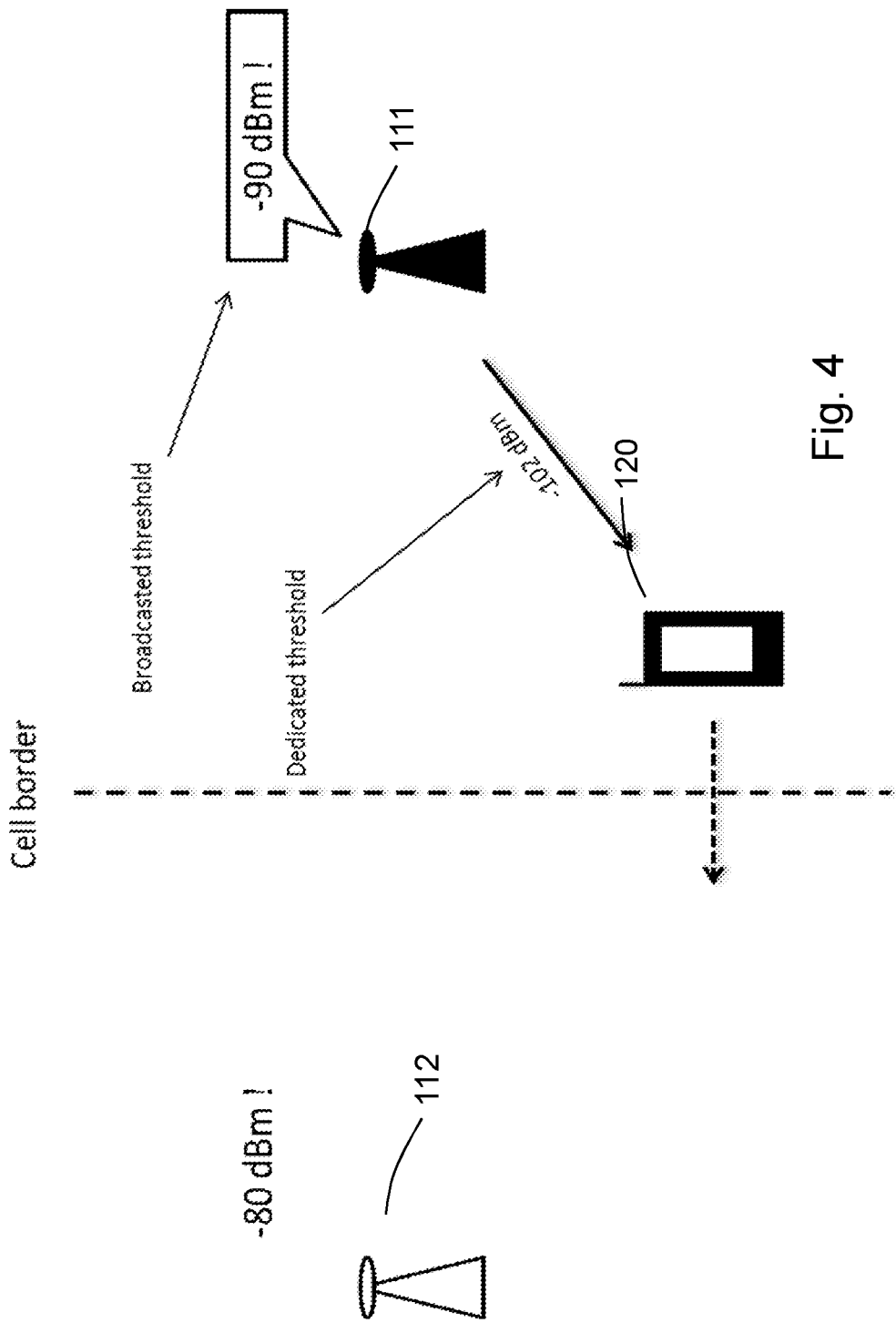
FIG. 4 is a flowchart depicting embodiments of a method in an electronic device.

In these embodiments the terminal 120 will act according to a dedicated parameter such as a threshold after a cell change given that certain conditions are fulfilled. When the conditions are no longer fulfilled the terminal 120 will stop acting according to the dedicated threshold and instead act according to the corresponding broadcasted threshold. Example conditions are:

The broadcasted threshold corresponding to the dedicated threshold in the new cell is equal to, or is close to by a threshold $TH_{close}$, to the broadcasted thresholds of the cell in which the dedicated thresholds were acquired. E.g. the terminal 120 acquired a dedicated RSRP threshold of −102 dBm in cell A and the terminal 120 leaves cell A when the broadcasted RSRP threshold in cell A was −90 dBm. The terminal 120 enters cell B, wherein the broadcasted threshold also is −90 dBm, the terminal 120 will continue to act according to the dedicated threshold value of −102 dBm. However, if broadcasted threshold in cell B was −80 dBm the terminal 120 would start acting according to that broadcasted threshold, given that $TH_{close}$ is smaller than 10 dB, see an example in FIG. 4. FIG. 4 illustrates an example where the terminal 120 will stop act according to a dedicated threshold upon cell change due to a large difference between broadcasted thresholds in old cell such as the first cell 115 and new cell such as the second cell 116.

According to some embodiments, the new cell such as the second cell 116 belongs to a set of cells for which threshold retention is allowed or required. Which cells this is allowed or required for may be configured by the network, e.g. by a list of cell or Tracking Area or Routing Area identifiers.

According to some embodiments, the UE such as the terminal 120 has performed less than a number $N_{cell\ changes}$ cell changes since the dedicated threshold was received. The terminal 120 will then count the number of cell changes, from that it has received the dedicated thresholds, or from that it has received the dedicated threshold, and when it has reached $N_{cell\ changes}$ it will no longer act according to the dedicated threshold. In one alternative of this condition, if the terminal 120 re-enters the cell in which it received the dedicated thresholds it will restart the counting from zero.

Threshold Retention Based on Change of Corresponding Broadcasted Threshold.

In these embodiments the terminal 120 will maintain and act according to a dedicated threshold until the corresponding broadcasted threshold change. In one alternative of these embodiments the broadcasted thresholds are considered changed, also referred to as updated, when the size of the change exceeds a certain threshold $TH_{changed}$. The size of the change may be defined, e.g., as the difference between current threshold value and the thresholds value at the time when the terminal 120 entered IDLE mode alternatively the size of the change may be defined as the difference between the current threshold value and the threshold value at the time when the dedicated threshold was signalled.

According to this embodiment, if the terminal 120 has received a dedicated RSRP threshold of −102 dBm and the corresponding broadcasted threshold, i.e. the threshold for RSRP, is −90 dBm the terminal 120 will maintain and act according to the RSRP threshold −102 dBm until the broadcasted threshold deviated from −90 dBm. Or as an alternative version of this embodiment describes, if the $TH_{changed}$ is 2 dB the terminal 120 will maintain and act according to the RSRP threshold −102 dBm as long as the broadcasted threshold value stays within the range −92 dBm to −88 dBm, i.e., within 2 dB of −90 dBm. See FIG. 5. FIG. 5 depicts example showing threshold retention based on behaviour of corresponding broadcasted threshold.

Threshold Tracking

According to these embodiments the terminal 120 will update a threshold received by dedicated signalling according to certain rules. This may be referred to as threshold tracking or parameter tracking.

An example of such a rule is to update a threshold received with dedicated signalling by considering the change of the corresponding broadcasted thresholds. For example if the terminal 120 observes that the broadcasted threshold is increased by X the terminal 120 would update the corresponding dedicated threshold increasing it with X. For example, the terminal 120 has received a dedicated RSRP threshold of −102 dBm and the broadcasted RSRP threshold is −90 dBm. If the broadcasted RSRP threshold is increased to −86 dBm, the terminal 120 will then update the RSRP threshold value accordingly, i.e. to −102 dBm+4 dB=−98 dBm.

The terminal 120 may be configured such that it will perform threshold tracking given certain conditions. If one or more of the conditions are not fulfilled the terminal may stop threshold tracking and apply the broadcasted threshold. Example of conditions comprises:

Threshold tracking may only be performed for a limited period of time $T_{tracking}$ from that the terminal 120 has received the dedicated threshold.

Threshold tracking may only be performed as long as the terminal 120 stays within the same cell as was in when it received the dedicated threshold.

Threshold tracking may only be performed given that deviation from the originally dedicated threshold is smaller than a threshold $TH_{tracking}$.

Figure 6:
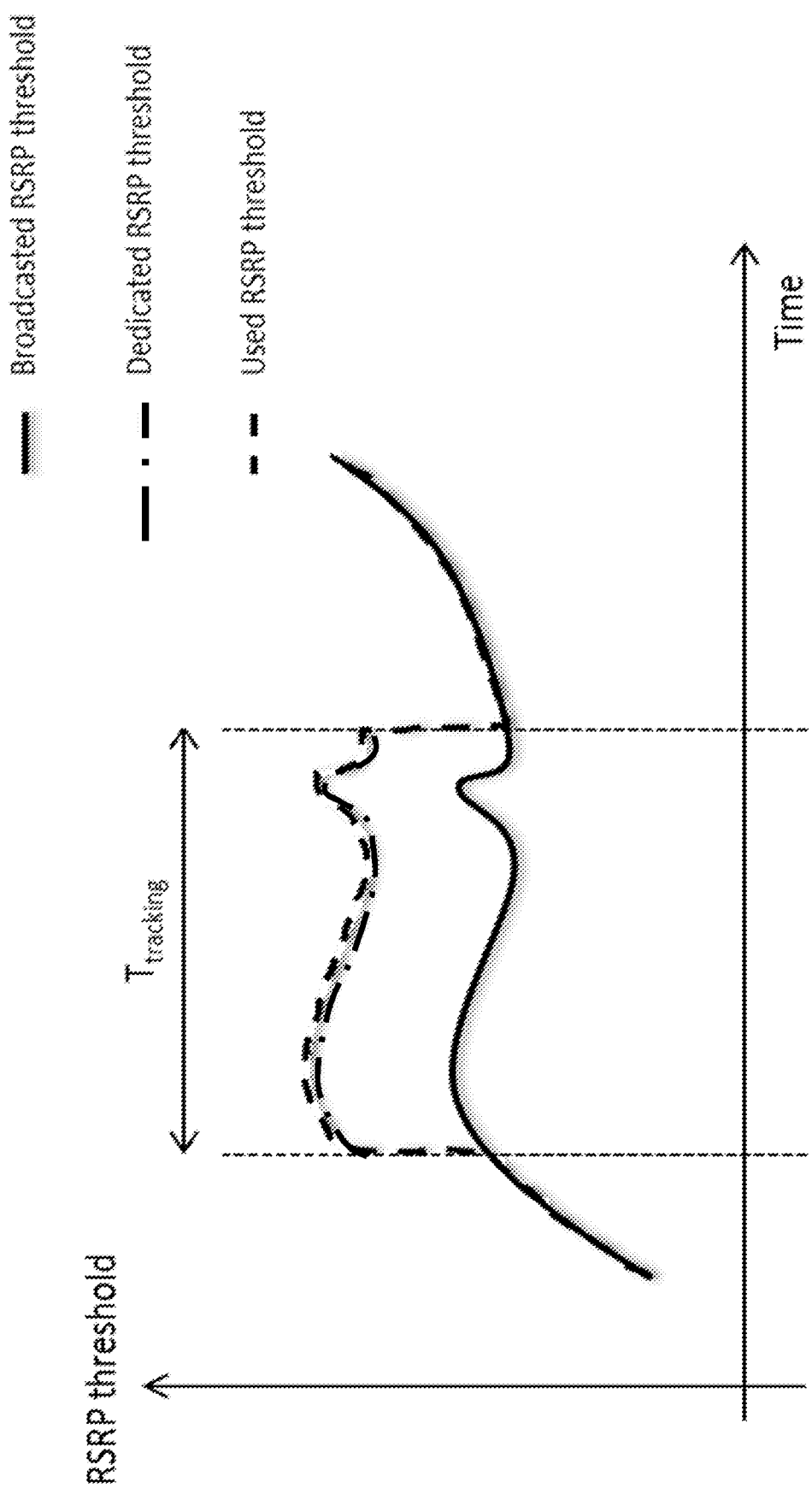
FIG. 6 is a schematic block diagram illustrating embodiments herein.

FIG. 6 illustrates am example showing threshold tracking.

Scaled Threshold Tracking

In an alternative of these embodiments scaled threshold tracking is performed. When updating the dedicated threshold the terminal 120 will multiply the change of the broadcasted threshold with a scaling factor k. I.e. the terminal 120 may upon a change of X to the broadcasted threshold update the corresponding dedicated signaled threshold by k*X. Possible scaling factors include but are not limited to constants and functions. For example, k=C or k=f(m) where m=abs, (reference broadcasted threshold value−current broadcast threshold value).

Scaled threshold tracking with a scaling factor 0.5 may be performed as follows. The terminal 120 has received a dedicated threshold for RSRP of −102 dBm and the broadcasted RSRP threshold is −90 dBm. If the broadcasted RSRP threshold is increased by 4 dB to −86 dBm the terminal will update the threshold value it has received by dedicated signaling to −102 dBm+0.5*4 dB=−100 dBm.

Selection of Behaviour for Terminals Capable of Multiple Behaviours

It has herein been described different embodiments for threshold and parameter handling. The terminal 120 may be configured so that it only performs a method given certain conditions, e.g. when being in a specific terminal mode such as e.g. RRC Idle or RRC Connected mode.

Which behaviour should be applied by the terminal 120 may, for example, be selected according to the below alternatives:

In a first alternative the terminal 120 decides which behaviour should be applied. The terminal 120 may follow certain rules for which behaviour to apply in which situation. For example if the terminal 120 is connected to WLAN it may retain the dedicated thresholds according to but if, on the other hand, the terminal 120 is not connected to WLAN it may not retain dedicated thresholds.

In a second alternative the network decides which behaviour should be applied and indicates this to the terminal. The network such as the network node 111 may indicate this by signalling an indicator to the terminal 120. With this alternative the terminal 120 may indicate to the network which behaviours it is capable of, or it may be implicitly known to the network.

Acquiring of Parameters Related to Above Embodiments

The parameters described in the above embodiments, $TH_{close}$, $N_{cell\ changes}$, $TH_{changed}$, $T_{tracking}$, $TH_{tracking}$, k, etc. may be preconfigured, also referred to as configured, in the terminal 120, may be signalled to the terminal 120 from the network such as the network node 111 or may be selected by the terminal 120 itself based on, for example, UE speed, etc.

Figure 7:
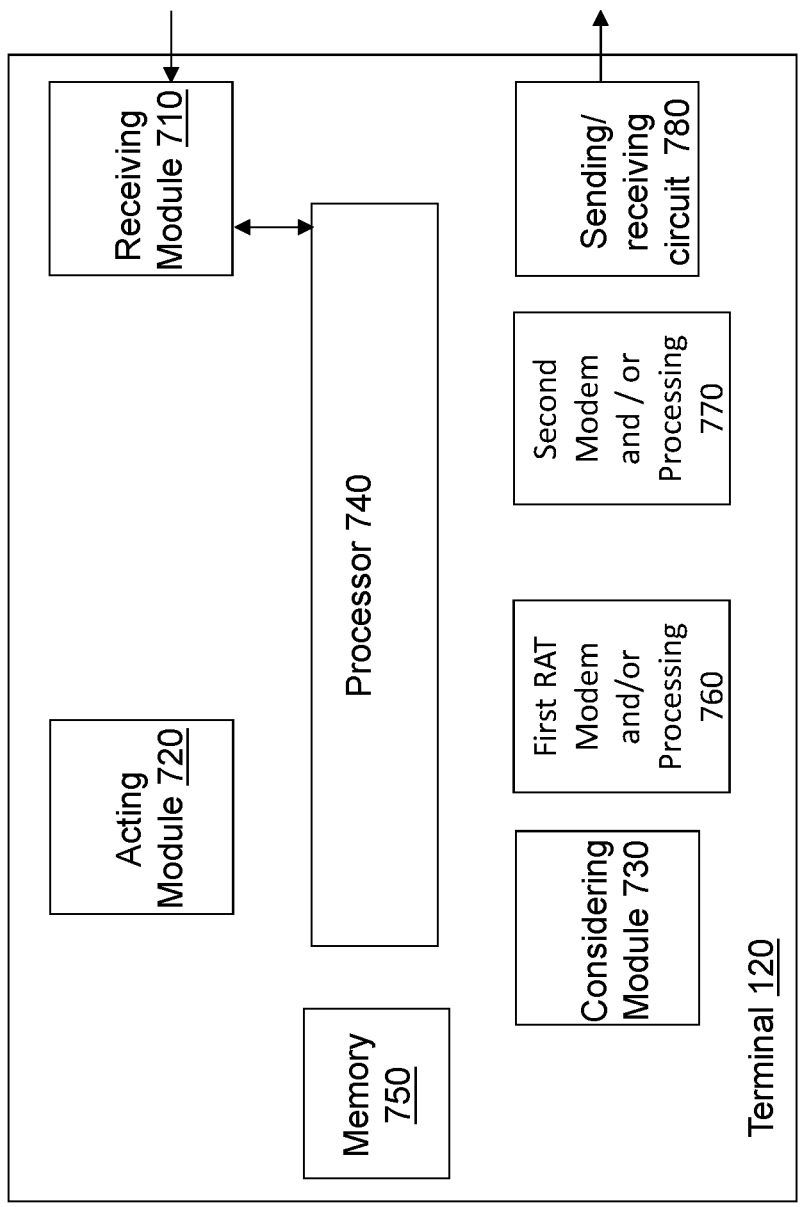
FIG. 7 is a schematic block diagram illustrating embodiments of a terminal.

To perform the method actions for inter RAT access selection described above in relation to FIGS. 2-6, the terminal 120 may comprise the following arrangement depicted in FIG. 7. As mentioned above, the terminal 120 being capable to operate in one or more Radio Access Technologies, RATs.

The terminal 120 is configured to, e.g. by means of a receiving module 710 configured to:
  receive from a network node 111, one or more dedicated parameters relating to inter RAT access selection, and
  receive from the network node 111, one or more broadcasted parameters relating to inter RAT access selection, which one or more broadcasted parameters at least partly correspond to the respective one or more dedicated parameters. The one or more broadcasted parameters relate to inter RAT access selection.

The terminal 120 is further configured to, e.g. by means of an acting module 720 configured to, act for inter RAT access selection according to any one out of:
  one or more updated dedicated parameters, updated based on changes to corresponding one or more broadcast parameters, and
  any one out of the one or more received dedicated parameters, updated dedicated parameters, or corresponding broadcasted parameters, based on whether one or more conditions are fulfilled or not.

The terminal (120) according to claim 9, wherein terminal 120 further is configured to act for inter RAT access selection according to the one or more received dedicated parameters, updated dedicated parameters, or corresponding broadcasted parameters, based on whether one or more conditions are fulfilled or not, comprises one or more out of:
  when one or more conditions are fulfilled keep acting according to the one or more received dedicated parameters,
  when the one or more conditions are fulfilled, act according to one or more updated dedicated parameters, updated based on changes to corresponding one or more broadcast parameters
  when the one or more conditions are not fulfilled or are no longer fulfilled, consider the one or more dedicated parameters obsolete, and
  when the one or more conditions are not fulfilled or are no longer fulfilled, act according to one or more updated dedicated parameters, updated based on changes to corresponding one or more broadcast parameters, and
  when the one or more conditions are not fulfilled or are no longer fulfilled, act according to the corresponding broadcasted parameters.

In some embodiments, wherein the terminal 120 has changed cell from the first cell 115 to the second cell 116, the terminal 120 may have received an indication from a network node. The indication relates to a set of cells. In these embodiments, the one or more conditions for acting for inter RAT access selection may comprise whether or not the second cell 116 is one of the cells in the set of cells.

The conditions may be any one or more out of:
  conditions relating to parameters of a second cell 116, after the terminal 120 has changed cell from a first cell 115 to the second cell 116, and
  conditions relating to the broadcast parameters being changed,
  conditions relating to the terminal 120 having performed less than a number of cell changes since the dedicated threshold was received.

In some embodiments, the one or more dedicated parameters are considered obsolete. In these embodiments the terminal 120 may further be configured to act according to the received broadcasted parameters.

In some alternative embodiments, the terminal 120 is configured to e.g. by means of a considering module 730, consider the one or more dedicated parameters obsolete. In these embodiments, the terminal 120 may further be configured to acquire one or more new dedicated parameters by a Radio Access network, RAN.

The terminal 120 may further be configured to act for inter RAT access selection when the terminal 120 is not able to receive or is configured not to receive dedicated parameters any more.

In some embodiments, the one or more broadcasted parameters is represented by one or more broadcasted thresholds, and the one or more dedicated parameters is represented by one or more dedicated thresholds. In some embodiments, the one or more conditions comprises that the broadcasted one or more parameters such as the one or more broadcasted thresholds in the second cell 116 corresponding to the dedicated parameters such as the one or more dedicated thresholds is equal to, or is close to by a threshold, to the one or more broadcasted parameters such as the one or more broadcasted thresholds of the first cell 115 in which the dedicated parameters such as the one or more dedicated thresholds were received.

The terminal 120 may further be configured to act for inter RAT access selection comprising to update the one or more dedicated parameters such as the one or more dedicated thresholds by considering a change of the corresponding one or more broadcasted parameters such as the one or more broadcasted thresholds. The one or more dedicated parameters such as the one or more dedicated thresholds may be updated by multiplying a change of the one or more broadcasted parameters such as the one or more broadcasted thresholds with a scaling factor.

The embodiments herein may be implemented through one or more processors, such as a processor 740 in the terminal 120 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the terminal 120. One such carrier may be in the form of a CD ROM disc. It is however feasible with other data carriers such as a memory stick. The computer program code may furthermore be provided as pure program code on a server and downloaded to the terminal 120.

The terminal 120 may further comprise a memory 750 comprising one or more memory units. The memory 120 is arranged to be used to store received information, parameters, thresholds, data, configurations, schedulings, and applications etc. to perform the methods herein when being executed in the terminal 120.

Those skilled in the art will also appreciate that the circuits described below may refer to a combination of analog and digital circuits, and/or one or more processors configured with software and/or firmware, e.g. stored in the memory 750, that when executed by the one or more processors such as the processor 750 in the terminal 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Embodiments of the terminal as described above such as e.g. the terminal 120, may be configured to communicating both over a 3GPP-specified access technology and also over an 802.11 Wi-Fi specified access technology. The processing and modem related to the Wi-Fi parts 760 may be separated from the processing and modem related to the 3GPP parts 770. It will be appreciated that the implementation of these portions could be integrated on the same hardware unit, or can be carried out using physically distinct hardware and/or hardware-software combinations. The terminal further comprises a sending and receiving circuit 780.

Figure 8:
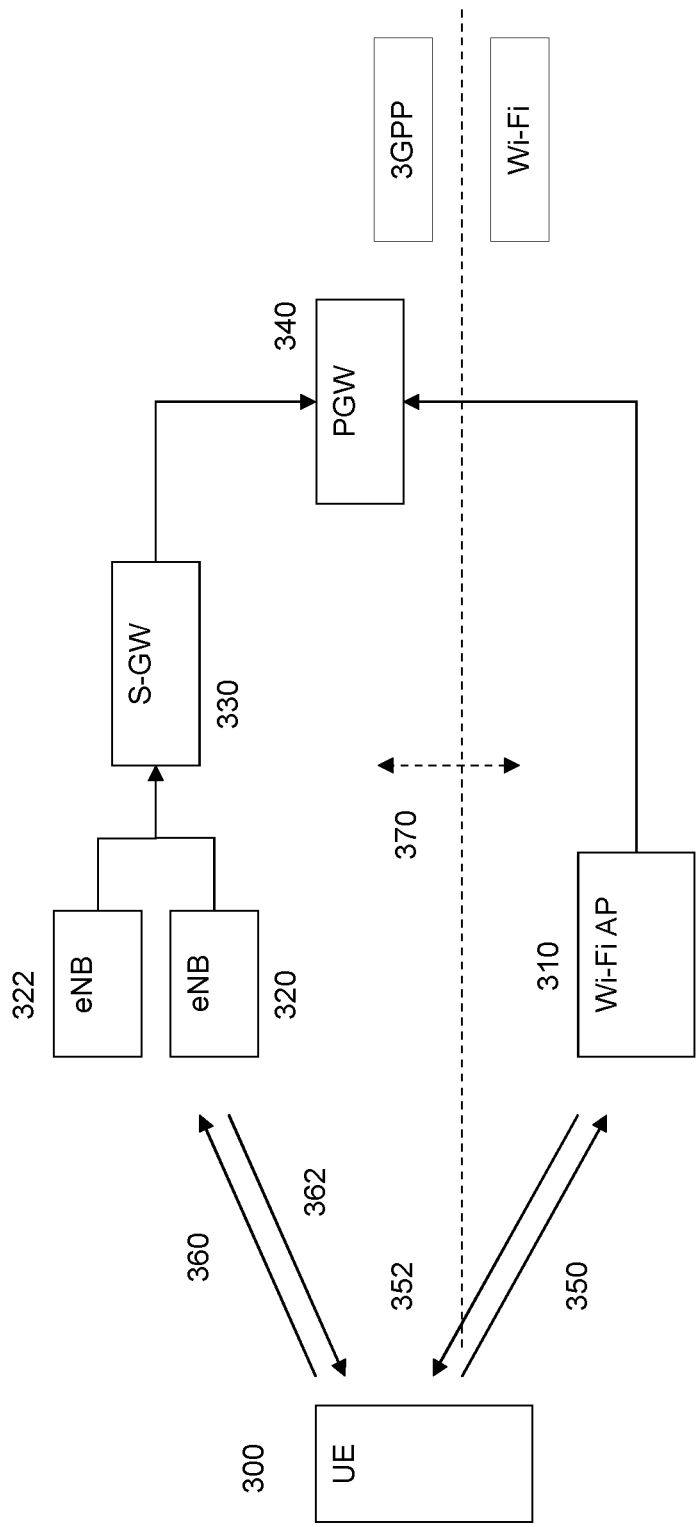
FIG. 8 is a schematic block diagram illustrating embodiments of a network.

FIG. 8 illustrates a network such as the wireless communications network 100 where LTE radio access parts 320, 322 and a Wi-Fi wireless access point 310 are both connected to the same Packet Data Network Gateway (P-GW) 340. A P-GW provides connectivity from a UE 300 such as the terminal 120 to external packet data networks by being the point of exit and entry of traffic for the UE. The UE 300 such as e.g. the terminal 120 is capable of being served both from the W-Fi Access Point 310 and the LTE eNBs 320, 322. FIG. 8 illustrates one possible way of connecting a W-Fi access network to the same core network as the 3GPP-specified access network. It should be noted that the presently disclosed techniques are not restricted to scenarios where the Wi-Fi access network is connected in this way.

There may be an interface 370 between the Wi-Fi and 3GPP domains, whereby the two networks may exchange information that may be used to facilitate on steering traffic over the right network. One example of such information exchanged via the interface 370 is load conditions in the two networks. The two networks may also exchange information with regard to the context of the UE 300 such as the terminal 120, so that each may be aware of whether the UE 300 is being served by the other network, as well as some details of the connection over the other network, e.g. traffic volume, throughput, etc. . . .

It should be noted that Access-point Controller (AC) functionality exists in the W-Fi domain that controls the W-Fi AP. This functionality, though not depicted in the figure for the sake of clarity, may be physically located in the Wi-Fi wireless access point 310, the P-GW 340 or another separate physical entity.

In this document it is described how a UE such as the terminal 120 maintains parameters such as threshold values which may be both broadcasted and unicasted.

In some embodiments the terminal 120 will act according to a dedicated threshold after a cell change given certain conditions.

In some other embodiments the terminal 120 will act according to a dedicated threshold, based on conditions of how the corresponding broadcasted threshold, changes.

In some other embodiments the terminal 120 will perform threshold tracking where it updates a dedicated threshold based on how the corresponding broadcasted threshold changes.

The following embodiment is applicable to or may be combined with any suitable embodiment described above. A method in a terminal such as e.g. the terminal 120 is provided. In some embodiments, the terminal 120 is capable to operate in one or more RATs for example in a first RAT network such as e.g. a 3GPP network and a second RAT such as e.g. WLAN.

The method may comprise any one or more of the following actions.

(1). In some embodiments, the terminal 120 receives from a network node such as e.g. the network node 111, one or more dedicated parameters. The dedicated parameters may be information about one or more first thresholds relating to inter RAT access selection e.g. comprising the first and second RAT networks. The dedicated information about one or more first thresholds relating to inter RAT access selection may be referred to as the dedicated threshold or the dedicated parameters. This action may be performed by the sending/receiving circuit 780 within the terminal such as the terminal 120.

(2). In some embodiments, the terminal 120 receives from a network node such as e.g. the network node 111, one or more broadcasted parameters. The one or more broadcasted parameters correspond to the one or more dedicated parameters. This means e.g. that the one or more broadcasted parameters have corresponding dedicated parameters. The one or more broadcasted parameters may be information about one or more second thresholds relating to inter RAT access selection e.g. comprising the first and second RAT networks. The broadcasted information about the one or more second thresholds relating to inter RAT access selection is referred to as the broadcasted threshold or the broadcasted parameters. This action may be performed by the sending/receiving circuit 780 within the terminal such as the terminal 120.

(3). In some embodiments, the terminal 120 acts according to the dedicated parameters. This action may be performed by a selecting circuit within the terminal such as the terminal 120.

(4). In some embodiments, when the terminal 120 is not able to receive or is configured not to receive dedicated parameters any more, the terminal 1202 keeps acting according to the received dedicated parameters when one or more condition s are fulfilled, which conditions are any one or more out of:
 conditions relating to parameters of a second cell, after the terminal has changed cell from a first cell to the second cell, also referred to as cell A and cell B, and
 conditions relating to the broadcast parameters being changed.

This action may be performed by the selecting circuit within the terminal such as the terminal 120.

(5). In some embodiments, when the one or more conditions are not fulfilled or are no longer fulfilled, the terminal 120 will consider the dedicated parameters obsolete. In some embodiments, the terminal 120 acts according to the received broadcasted parameters or the broadcasted parameters being changed when it has considered the dedicated parameters obsolete. It may be so that the terminal 120 will discard dedicated parameters which are considered obsolete. This action may be performed by the selecting circuit within the terminal such as the terminal 120.

In an alternative embodiment, the terminal 120, instead of starting to apply the broadcasted parameters, it may acquire new dedicated parameters by the RAN. The terminal 120 may then go to RRC Connected (if it was RRC idle), and it may send an indication to the RAN that the dedicated thresholds or parameters it had become obsolete.

Therefore, in some embodiments, when the terminal 120 considers the dedicated thresholds obsolete the terminal 120 will apply the broadcasted parameters such as thresholds and, in some embodiments when the terminal 120 considers the dedicated parameters such as thresholds obsolete the terminal 120 will acquire new dedicated parameters such as thresholds.

(6). In some embodiments, as an alternative when the one or more conditions are not fulfilled, the terminal 120 updates the dedicated parameters based on the changed broadcast parameters, and acts according to the updated dedicated parameters.

In some embodiments when the one or more conditions are fulfilled, the terminal 120 updates the dedicated parameters based on the changes to corresponding broadcast parameters, and acts according to the updated dedicated parameters. This action may be performed by the selecting circuit within the terminal such as the terminal 120.

The terminal 120 may comprise an interface unit to facilitate communications between the terminal 120 and the network node 111, 112 or any other access point and other nodes or devices, e.g., UEs. The interface may, for example, include a transceiver configured to transmit and receive radio signals over an air interface in accordance with a suitable standard.

The invention claimed is:

1. A terminal for inter-RAT access selection, the terminal being capable to operate in one or more Radio Access Technologies (RATs), wherein the terminal comprises:
   a transceiver configured to transmit and receive radio signals, and
   a processing circuit configured to:
      receive from a network node, one or more dedicated parameters comprising one or more thresholds for inter-RAT access selection,
      receive from the network node, one or more broadcasted parameters comprising one or more thresholds for inter-RAT access selection, wherein the one or more broadcasted parameters at least partly correspond to the respective one or more dedicated parameters; and
      act for inter-RAT access selection according to any one out of:
         one or more updated dedicated parameters, updated based on changes to corresponding one or more broadcast parameters; and
         any one out of the one or more received dedicated parameters, updated dedicated parameters, or corresponding broadcasted parameters, based on whether one or more conditions are fulfilled or not.

2. The terminal of claim 1, wherein the processing circuit further is configured to act for inter-RAT access selection according to the one or more received dedicated parameters, updated dedicated parameters, or corresponding broadcasted parameters, based on whether one or more conditions are fulfilled or not, comprises one or more out of:
   when one or more conditions are fulfilled, continuing to act according to the one or more received dedicated parameters;
   when the one or more conditions are fulfilled, act according to one or more updated dedicated parameters, updated based on changes to corresponding one or more broadcast parameters;
   when the one or more conditions are not fulfilled or are no longer fulfilled, consider the one or more dedicated parameters obsolete;
   when the one or more conditions are not fulfilled or are no longer fulfilled, act according to one or more updated dedicated parameters, updated based on changes to corresponding one or more broadcast parameters; and
   when the one or more conditions are not fulfilled or are no longer fulfilled, act according to the corresponding broadcasted parameters.

3. The terminal of claim 1, wherein the terminal has changed cell from a first cell to a second cell, wherein the terminal has received an indication from a network node, which indication relates to a set of cells, and wherein the one or more conditions for acting for inter-RAT access selection comprise whether or not the second cell is one of the cells in the set of cells.

4. The terminal of claim 1, wherein the conditions are any one or more out of:
   conditions relating to parameters of a second cell, after the terminal has changed cell from a first cell to the second cell;
   conditions relating to the broadcast parameters being changed; and
   conditions relating to the terminal having performed less than a number of cell changes since the dedicated threshold was received.

5. The terminal of claim 2, wherein the one or more dedicated parameters are considered obsolete, the terminal further being configured to act according to the received broadcasted parameters.

6. The terminal of claim 2, wherein the processing circuit is configured to considering the one or more dedicated parameters obsolete, the processing circuit further being configured to acquire one or more new dedicated parameters by a Radio Access network (RAN).

7. The terminal according to of claim 1, wherein the processing circuit further is configured to act for inter-RAT access selection when the terminal is not able to receive or is configured not to receive dedicated parameters any more.

8. The terminal of claim 1, wherein the processing circuit further is configured to act for inter-RAT access selection comprising to update the one or more dedicated parameters by considering a change of the corresponding one or more broadcasted parameters.

9. The terminal of claim 8, wherein the one or more dedicated parameters are updated by multiplying a change of the broadcasted threshold with a scaling factor.

10. The terminal of claim 1, wherein the one or more conditions comprises that the broadcasted one or more parameters in the second cell corresponding to the one or more dedicated parameters is equal to, or is within a threshold amount of, the one or more broadcasted parameters of the first cell in which the dedicated thresholds were received.

* * * * *

UNITED STATES PATENT AND TRADEMARK OFFICE
CERTIFICATE OF CORRECTION

PATENT NO. : 10,939,368 B2
APPLICATION NO. : 14/910891
DATED : March 2, 2021
INVENTOR(S) : Bergström et al.

It is certified that error appears in the above-identified patent and that said Letters Patent is hereby corrected as shown below:

In the Drawings

In Fig. 8, Sheet 8 of 8, for Tag "340", in Line 1, delete "PGW" and insert -- P-GW --, therefor.

In the Specification

In Column 2, Line 1, delete "Specifications")." and insert -- Specifications". --, therefor.

In Column 2, Line 49, delete "to e.g.," and insert -- to Wi-Fi, e.g., --, therefor.

In Column 3, Line 32, delete "W-Fi" and insert -- Wi-Fi --, therefor.

In Column 7, Line 23, delete ""traffic routing." and insert -- "traffic routing". --, therefor.

In Column 8, Line 45, delete "116, and" and insert -- 116, --, therefor.

In Column 8, Line 47, delete "changed," and insert -- changed, and --, therefor.

In Column 10, Line 34, delete "may" and insert -- may be --, therefor.

In Column 12, Line 19, delete "am" and insert -- an --, therefor.

In Column 12, Line 65, delete "$N_{cell\ changes}$" and insert -- $N_{cell\ changes}$, --, therefor.

In Column 13, Line 41, delete "parameters" and insert -- parameters, --, therefor.

In Column 13, Line 44, delete "obsolete, and" and insert -- obsolete, --, therefor.

In Column 13, Line 62, delete "116, and" and insert -- 116, --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,939,368 B2

In Column 13, Line 64, delete "changed," and insert -- changed, and --, therefor.

In Column 14, Line 47, delete "CD ROM" and insert -- CD-ROM --, therefor.

In Column 14, Line 63, delete "processor 750" and insert -- processor 740 --, therefor.

In Column 15, Line 29, delete "W-Fi" and insert -- Wi-Fi --, therefor.

In Column 15, Line 30, delete "W-Fi" and insert -- Wi-Fi --, therefor.

In Column 15, Line 47, delete "W-Fi" and insert -- Wi-Fi --, therefor.

In Column 15, Line 48, delete "W-Fi" and insert -- Wi-Fi --, therefor.

In Column 16, Line 39, delete "terminal 1202" and insert -- terminal 120 --, therefor.

In Column 16, Line 65, delete "parameters it had" and insert -- parameters had --, therefor.

In the Claims

In Column 18, Line 40, in Claim 7, delete "terminal according to of" and insert -- terminal according to --, therefor.